(12) United States Patent
Du et al.

(10) Patent No.: US 11,799,576 B2
(45) Date of Patent: Oct. 24, 2023

(54) DATA SENDING METHOD AND APPARATUS, AND FLEXE SWITCHING SYSTEM

(71) Applicant: HUAWEI TECHNOLOGIES CO., LTD., Guangdong (CN)

(72) Inventors: Wenhua Du, Dongguan (CN); Tao Lin, Shenzhen (CN); Min Chen, Nanjing (CN); Feng Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 17/242,929

(22) Filed: Apr. 28, 2021

(65) Prior Publication Data

US 2021/0250112 A1 Aug. 12, 2021

Related U.S. Application Data

(63) Continuation of application No. PCT/CN2018/112555, filed on Oct. 30, 2018.

(51) Int. Cl.
*H04J 3/06* (2006.01)
*H04J 3/16* (2006.01)

(52) U.S. Cl.
CPC .......... *H04J 3/0605* (2013.01); *H04J 3/1658* (2013.01)

(58) Field of Classification Search
CPC ...... H04J 3/0605; H04J 3/1658; H04J 3/0602; H04J 2203/0085; H04L 45/66; H04L 49/351; H04L 49/352
See application file for complete search history.

(56) References Cited

U.S. PATENT DOCUMENTS

| 6,081,576 A | 6/2000 | Schanen et al. |
| 2008/0310453 A1 | 12/2008 | Bargauan |
| 2017/0005742 A1 | 1/2017 | Gareau et al. |

FOREIGN PATENT DOCUMENTS

| CN | 106612203 A | 5/2017 |
| CN | 108092739 A | 5/2018 |

(Continued)

OTHER PUBLICATIONS

OIF, "Flex Ethernet Implementation Agreement," IA# OIF-FLEXE-01.1, Jun. 21, 2017, 35 pages.

(Continued)

*Primary Examiner* — Michael K Phillips
(74) *Attorney, Agent, or Firm* — Fish & Richardson P.C.

(57) ABSTRACT

This application discloses example data sending methods and apparatuses, and an example FlexE switching system. In one example, when slice packets received include a SOP flag and an EOP flag of a same data packet, immediately data packet slices is restored in the slice packets to a FlexE data stream and the FlexE data stream is sent, or the data packet slices are restored in the slice packets to the FlexE data stream and the FlexE data stream is sent when a latency is greater than or equal to a first present duration. When the slice packets received include the SOP flag but do not include the EOP flag of a data packet, the data packet slices are restored in the slice packets and the FlexE data stream is sent when the latency reaches a second preset duration. The first preset duration is less than the second preset duration.

12 Claims, 5 Drawing Sheets

(56) References Cited

FOREIGN PATENT DOCUMENTS

| CN | 108092924 | A  |   | 5/2018 |           |
|----|-----------|----|---|--------|-----------|
| CN | 108462646 | A  |   | 8/2018 |           |
| EP | 3113502   | A1 | * | 1/2017 | G06F 13/40 |
| EP | 3197172   | A1 |   | 7/2017 |           |

OTHER PUBLICATIONS

PCT International Search Report and Written Opinion in International Application No. PCT/CN2018/112555, dated Jul. 30, 2019, 17 pages.
Extended European Search Report issued in European Application No. 18938640.2 dated Sep. 22, 2021, 8 pages.
Office Action issued in Chinese Application No. 201880098323.5 dated Dec. 10, 2021, 9 pages (with English translation).

* cited by examiner

DATA SENDING METHOD AND APPARATUS, AND FLEXE SWITCHING SYSTEM

CROSS-REFERENCE TO RELATED APPLICATIONS

This application is a continuation of International Application No. PCT/CN2018/112555, filed on Oct. 30, 2018, the disclosure of which is hereby incorporated by reference in its entirety.

TECHNICAL FIELD

This application relates to the field of communications technologies, and in particular, to a data sending method and apparatus, and a FlexE switching system.

BACKGROUND

A flexible Ethernet (FlexE) technology is an interface technology for implementing service isolation bearing and network slicing on a bearer network, develops rapidly in recent years, and is widely accepted by major standard organizations.

A FlexE standard is originated from an optical internet forum (Optical internet forum, OIF) interface physical layer standard. The FlexE standard is recognized by global mainstream carriers and suppliers because of its flexible bandwidth adjustment, data isolation, perfect fit for 5G services, and the like.

A FlexE technology adds a FlexE shim layer to an intermediate layer between a MAC (Media Access Control, media access control) layer and a PHY (Port Physical Layer, port physical layer) layer of an Ethernet through lightweight enhancement on the Ethernet. The FlexE shim layer schedules and distributes data of a plurality of client interfaces to different subchannels in a timeslot mode based on a time division multiplexing distribution mechanism. Taking a 100GE channel as an example, the channel can be divided into 20 subchannels of 5G rate by using the FlexE shim, and each client-side interface can specify use of one or more subchannels to achieve service isolation.

To implement excellent attributes such as an ultra-low latency, network slicing, and an ultra-large capacity, a cell switching mechanism with a flexible packet length is created by using a packet switching mechanism based on FlexE service transmission. After a data packet passes through a cell switching matrix, the data packet is restored to content and a rate of a FlexE client 66B code stream. The mechanism can enhance a protection and management capability of a data stream, flexibly expand a device capacity, and make ultra-low service latency possible.

To implement cell switching, an existing solution is to slice a FlexE client 66B data stream into several data packet slices, generate slice packets based on the data packet slices, send the slice packets, set all received slice packets to be restored to a data stream after a latency of fixed duration, and then send the data stream. This method can ensure that the stream of the slice packets is not interrupted. However, the fixed duration set in this method is usually a longest path latency that is of slice packet transmission and that is obtained based on experience. In this way, a data sending latency based on a FlexE switching system is relatively long, and consequently, transmission efficiency of a FlexE data stream is relatively low.

SUMMARY

In view of this, this application provides a data sending method and apparatus, and a FlexE switching system, to reduce a data sending latency based on a FlexE switching system and improve transmission efficiency of a FlexE data stream.

To resolve the foregoing technical problems, the following technical solutions are used in this application.

A first aspect of this application provides a data sending method, applied to a sending module in a FlexE switching system. The method includes: receiving several slice packets; checking whether the several slice packets include a SOP (Start of Packet) flag and a EOP (End of Packet) flag; when the several slice packets include a SOP flag and a EOP flag of a same data packet, immediately restoring data packet slices in the several slice packets to a FlexE data stream, and sending the FlexE data stream, or when a latency is greater than or equal to first preset duration, restoring data packet slices in the several slice packets to a FlexE data stream, and sending the FlexE data stream; and when the several slice packets include a SOP flag of a data packet but do not include a EOP flag of the data packet, when a latency reaches second preset duration, restoring data packet slices in the several slice packets to a FlexE data stream, and sending the FlexE data stream, where the first preset duration is less than the second preset duration.

In the data sending method provided in the first aspect of this application, when the slice packets received by the sending module include the SOP flag and the EOP flag of the same data packet, it indicates that the sending module receives a complete data packet, and immediately sends the data packet slices, or sends the data packet slices after the latency of the first preset duration. In this way, a stream inside the data packet is not interrupted, a data sending latency is reduced, and transmission efficiency of the FlexE data stream is improved. When the slice packets received by the sending module include the SOP flag of the data packet but do not include the EOP flag of the data packet, it indicates that the sending module has not received a complete data packet, and then sends the data packet slices after the latency of the second preset duration is longer than the first preset duration. Therefore, according to the data sending method provided in this application, not all data packet slices need to be sent after uniform relatively long latency duration, but different latency duration is set for data packets of different sizes. Therefore, according to the data sending method provided in this application, a data sending latency of the FlexE switching system is reduced, and transmission efficiency of the FlexE data stream is improved.

In a possible implementation, the restoring data packet slices in the several slice packets to a FlexE data stream and sending the FlexE data stream when a latency is greater than or equal to first preset duration specifically includes: when slice packets including the SOP flag and the EOP flag of the same data packet are received within a first latency, when the latency reaches the first preset duration, restoring the data packet slices in the several slice packets to the FlexE data stream, and sending the FlexE data stream, where the first latency is less than the first preset duration; and when slice packets including the SOP flag and the EOP flag of the same data packet are received within a second latency, restoring, within the second latency, the data packet slices in the several slice packets to the FlexE data stream, and sending the FlexE data stream, where the second latency is greater than or equal to the first preset duration, and the second latency is less than or equal to the second preset duration. In this possible implementation, a transmission latency of a small data packet can be significantly shortened, and data packet transmission efficiency can be significantly improved.

In a possible implementation, the first preset duration is ¼ to ⅓ of the second preset duration.

In a possible implementation, the first preset duration is an average path latency for transmitting slice packets from an input module of the FlexE switching system to the sending module of the FlexE switching system.

In a possible implementation, the first preset duration is a path latency, in a path latency for transmitting slice packets from an input module of the FlexE switching system to the sending module of the FlexE switching system, that accounts for a preset proportion.

In a possible implementation, lengths of the data packet slices are the same or different.

In a possible implementation, the second preset duration is not less than a maximum path latency for transmitting the slice packets from the input module of the FlexE switching system to the sending module of the FlexE switching system, and the first preset duration is less than the second preset duration. This possible implementation can avoid that a stream inside a data packet is interrupted.

A second aspect of this application provides a data sending module, including: a receiving unit, configured to receive several slice packets; a check unit, configured to check whether the several slice packets include a SOP flag and a EOP flag; a first sending unit, configured to: when the several slice packets include a SOP flag and a EOP flag of a same data packet, immediately restore data packet slices in the several slice packets to a FlexE data stream, and send the FlexE data stream, or when a latency is greater than or equal to first preset duration, restore data packet slices in the several slice packets to a FlexE data stream, and send the FlexE data stream; and a second sending unit, configured to: when the several slice packets include a SOP flag of a data packet but do not include a EOP flag of the data packet, restore data packet slices in the several slice packets to a FlexE data stream and send the FlexE data stream when a latency reaches second preset duration, where the first preset duration is less than the second preset duration.

Based on the data sending module provided in the second aspect of this application, when the slice packets received by the sending module include the SOP flag and the EOP flag of the same data packet, it indicates that the sending module receives a complete data packet, and immediately sends the data packet slices, or sends the data packet slices after the latency is less than a maximum path latency of the slice packets. In this way, a stream inside the data packet is not interrupted, a data sending latency is reduced, and transmission efficiency of the FlexE data stream is improved. When the slice packets received by the sending module include the SOP flag of the data packet but do not include the EOP flag of the data packet, it indicates that the sending module has not received a complete data packet. In this case, the sending module sends the data packet slices after a latency of at least a maximum path latency of the slice packets, and a stream inside the slice packets is not interrupted. Therefore, by using the data sending module provided in this application, not all data packet slices need to be sent after the maximum path latency of the slice packets. Therefore, the data sending method provided in this application achieves an effect of reducing a data sending latency of the FlexE switching system and improving transmission efficiency of the FlexE data stream on the premise of avoiding that a stream inside the data packet is interrupted.

In a possible implementation, the first sending unit is specifically configured to: when the latency is greater than or equal to the first preset duration, restore the data packet slices in the several slice packets to the FlexE data stream, and send the FlexE data stream, where the first preset duration is less than the second preset duration.

A third aspect of this application provides a FlexE switching system, including: an input module, a switching module, and a sending module. The input module is configured to successively slice a received FlexE data stream into several data packet slices, and insert a time identifier corresponding to each data packet slice into each data packet slice, to generate several slice packets; the switching module is configured to switch the several slice packets from the input module to the sending module; and the sending module is the data sending module according to any one of the possible implementations of the second aspect.

According to the FlexE switching system provided in the third aspect of this application, when slice packets received by the sending module include a SOP flag and a EOP flag, it indicates that the sending module receives a complete data packet. In this case, the sending module sends the data packet slices. In this way, a stream inside the data packet is not interrupted, a data sending latency is reduced, and transmission efficiency of the FlexE data stream is improved. When the slice packets received by the sending module do not include a EOP flag, it indicates that the sending module has not received a complete data packet. In this case, the sending module sends the data packet slices after a maximum path latency of the slice packets, and a stream inside the data packet is not interrupted. Therefore, by using the FlexE switching system provided in this application, not all data packet slices need to be sent after a latency of specific duration. Data packet slices belonging to a small data packet are immediately sent after a complete data packet is received, and data packet slices belonging to a large data packet need to be sent after a latency of specific duration. Therefore, the data sending method provided in this application achieves an effect of reducing a data sending latency of the FlexE switching system and improving transmission efficiency of the FlexE data stream on the premise of avoiding that a stream inside the data packet is interrupted.

In a possible implementation, the FlexE switching system is a chassis structure, the chassis structure includes a line card and a fabric card, the input module and the sending module are disposed on the line card, and the switching module is disposed on the fabric card.

In a possible implementation, the FlexE switching system is an SOC box-shaped structure, the SOC box-shaped structure includes an SOC chip, and the input module, the switching module, and the sending module are disposed on the SOC chip.

In a possible implementation, there are a plurality of SOC chips, and the input module, the switching module, and the sending module are separately disposed on different SOC chips.

Compared with the prior art, this application has the following beneficial effects.

Based on the data sending method provided in this application, when slice packets received by a sending module include a SOP flag and a EOP flag of a same data packet, it indicates that the sending module receives a complete data packet, and immediately sends data packet slices, or sends data packet slices after a latency of first preset duration. In this way, a stream inside the data packet is not interrupted, a data sending latency is reduced, and transmission efficiency of a FlexE data stream is improved. When the slice packets received by the sending module include the SOP flag of the data packet but do not include the EOP flag of the data packet, it indicates that the sending module has not received a complete data packet, and then sends the data packet slices after the latency of the second preset duration longer than the first preset duration.

Therefore, according to the data sending method provided in this application, not all data packet slices need to be sent after uniform relatively long latency duration, but different latency duration is set for data packets of different sizes. Therefore, according to the data sending method provided in this application, a data sending latency of the FlexE switching system is reduced, and transmission efficiency of the FlexE data stream is improved.

DESCRIPTION OF EMBODIMENTS

With development of network communications, an Ethernet technology is further developed. In particular, the optical internet forum proposes a FlexE technology that supports a plurality of Ethernet MAC layer rates. The FlexE technology may be applied to an open system interconnection (Open System Interconnection, OSI) reference model. In addition, a specific implementation of the FlexE technology may be adding a FlexE shim layer between a physical layer and a data link layer of the OSI model.

Figure 1:
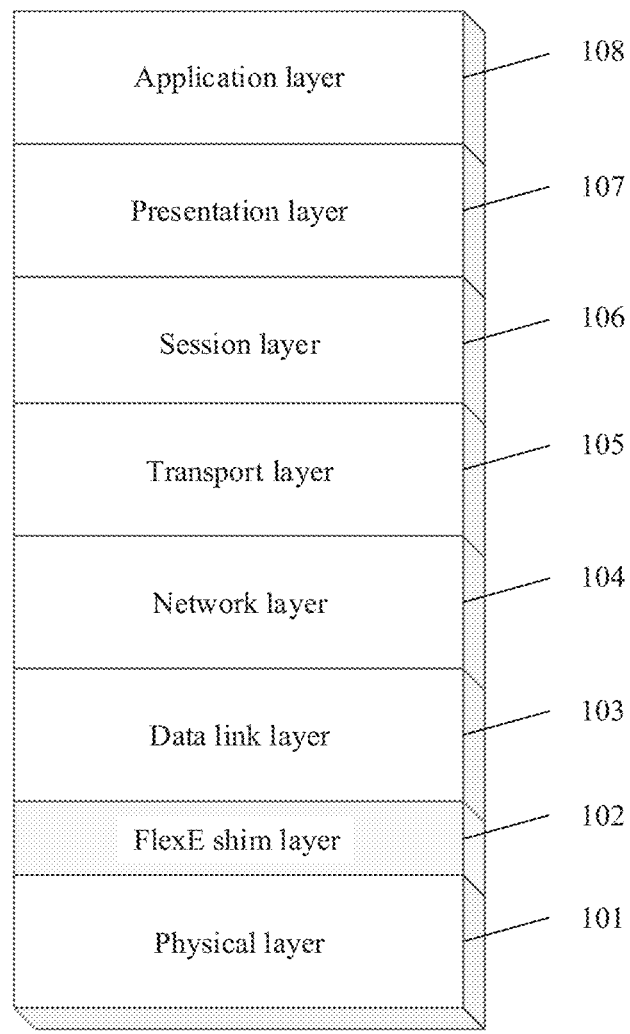
FIG. 1 is a schematic structural diagram in which a FlexE technology is applied to an Ethernet.

For ease of understanding and explanation, the following describes in detail, with reference to FIG. 1, an OSI model in which a FlexE shim layer is added.

FIG. 1 is a schematic structural diagram in which a FlexE technology is applied to an Ethernet.

An Ethernet structure in FIG. 1 includes a physical layer 101, a FlexE shim layer 102, a data link layer 103, a network layer 104, a transport layer 105, a session layer 106, a presentation layer 107, and an application layer 108. The FlexE shim layer 102 is located between the physical layer 101 and the data link layer 103.

The physical layer 101 is used to convert data into an electronic signal that can be transmitted through a physical medium.

It should be noted that, in an actual application, a port physical layer (Port Physical Layer, PHY) is usually used as a device that operates at the physical layer 101 of the OSI model, and the PHY connects a device at the data link layer 102 to the physical medium (for example, an optical fiber or a copper cable). For example, the PHY connects a media access control (Media Access Control, MAC) to the physical medium.

The FlexE shim layer 102 is used to flexibly and quickly transmit communication data between the physical layer 101 and the data link layer 103 through cell switching.

It should be noted that, to improve communication flexibility, the FlexE shim layer 102 is based on a time division multiplexing distribution mechanism. In a process of transmitting a data stream, the FlexE shim layer 102 may schedule data of a plurality of client interfaces and distribute the data to a plurality of different subchannels based on a timeslot manner. In an example of a 100GE channel, the channel can be divided into 20 subchannels of 5G rate by using the FlexE shim 102, and each client-side interface can specify use of one or more subchannels to achieve service isolation.

The data link layer 103 is used to determine a manner of accessing a network medium. At the data link layer 103, data is divided into frames and stream control is performed. Also, the data link layer 103 specifies a topology and provides hardware addressing.

The network layer 104 is used to address and select a route.

The transport layer 105 is used to provide a reliable connection from a host terminal to a host terminal on the other side.

The session layer 106 is used to establish a session, maintain a session, and manage a session.

The presentation layer 107 is used to negotiate a data exchange format, for example, negotiate a data format to be used for data processing, or negotiate whether data is encrypted. The application layer 108 is configured to provide an interface between an application program of a user and a network, to facilitate communication between different application programs.

However, to implement the cell switching at the FlexE shim layer 102, an existing solution is to slice a FlexE client 66B data stream into several data packet slices, generate slice packets based on the data packet slices, send the slice packets, set that all received slice packets are restored to a data stream after a latency of fixed duration, and then send the data stream. Usually, to prevent a packet loss phenomenon caused by a stream interruption inside a data packet, the foregoing specified fixed duration is usually not less than a longest path latency for transmitting the slice packets, and the longest path latency for transmitting the slice packets may be obtained based on experience.

Although the foregoing method can ensure that a stream of the slice packets is not interrupted and no packet loss occurs between the slice packets, this method still has the following problems.

All the slice packets need to be sent after the latency of the fixed duration, and the fixed duration is at least the longest path latency for transmitting the slice packets. However, not all transmission paths of all the slice packet require such a long latency. In addition, statistics show that only a small proportion (for example, 1%) of slice packet transmission requires such a long latency. Therefore, in the foregoing method for setting that all the slice packets need to be sent after a latency of specific duration, it is unnecessary for most slice packets. As a result, a sending latency in the foregoing data sending method based on a FlexE switching system is relatively long, and consequently, transmission efficiency of a FlexE data stream is relatively low.

To resolve the problems in the foregoing method, the inventors find the following through research.

A bearer service of the FlexE shim layer 201 is a protocol [802.3] data packet. The data packet includes a packet start character, service data, and a packet end character. In addition, the packet start character, the service data, and the packet end character respectively correspond to an S code block, a D code block, and a T code block in FIG. 82-5 in the protocol [802.3] (see FIG. 82-5 of the 802.3 protocol, linked at https://www.ieee802.org/3/df/public/22_10/22_1005/opsasnick_3df_01_221005.pdf).

Therefore, to improve transmission efficiency of the FlexE data stream, it may be determined, by detecting whether a slice packet including a SOP flag and a slice packet including a EOP flag of a same data packet are received, whether slice packets including all data of the data packet are received. If slice packets including all data of a data packet are received, all slice packets including the data of the data packet may be immediately restored to a data stream or may be restored to a data stream when a latency is less than a maximum path latency of the slice packets, and the data stream of the complete data packet is sent. In this way, there is no need to send the data stream after a latency of the maximum path latency. In this way, it can be ensured that a stream of slice packets is not interrupted, and efficiency of sending a small data packet can be further improved, to improve transmission efficiency of a FlexE data stream.

Based on the foregoing research, this application provides a data sending method applied to a sending module in a FlexE switching system. The method includes: After receiving several slice packets, the sending module in the FlexE switching system checks whether the several slice packets include a SOP flag and a EOP flag, and if two slice packets in the several slice packets include a SOP flag and a EOP flag of a same data packet, the sending module immediately restores data packet slices in the several slice packets to a FlexE data stream, and sends the FlexE data stream, or when a latency is greater than or equal to first preset duration, the sending module restores data packet slices in the several slice packets to a FlexE data stream, and sends the FlexE data stream; and if slice packets in the several slice packets include a SOP flag of a data packet but do not include a EOP flag of the data packet, the sending module restores data packet slices in the several slice packets to a FlexE data stream after a latency of second preset duration, and sends the FlexE data stream, where the first preset duration is less than the second preset duration.

In this method, when the slice packets received by the sending module include the SOP flag and the EOP flag of the same data packet, it indicates that the sending module receives a complete data packet, and immediately sends the data packet slices, or sends the data packet slices after a latency of the first preset duration. In this way, a stream inside the data packet is not interrupted, a data sending latency is reduced, and transmission efficiency of the FlexE data stream is improved. When the slice packets received by the sending module include the SOP flag of the data packet but do not include the EOP flag of the data packet, it indicates that the sending module has not received a complete data packet. In this case, the sending module sends the data packet slices after a latency of at least a maximum path latency of the slice packets, and a stream of the slice packets is not interrupted.

Therefore, according to the data sending method provided in this application, not all data packet slices need to be sent after the maximum path latency of the slice packets. Data packet slices belonging to a small data packet are immediately sent after a complete data packet is received or sent when a latency is less than a maximum path latency of slice packets. Data packet slices belonging to a large data packet need to be sent after a latency of a maximum path latency of slice packets. Therefore, the data sending method provided in this application achieves an effect of reducing a data sending latency of the FlexE switching system and improving transmission efficiency of the FlexE data stream on the premise of avoiding that a stream inside the data packet is interrupted.

To make a person skilled in the art understand the technical solutions in this application better, the following clearly describes the technical solutions in the embodiments of this application with reference to the accompanying drawings in the embodiments of this application.

Figure 2:
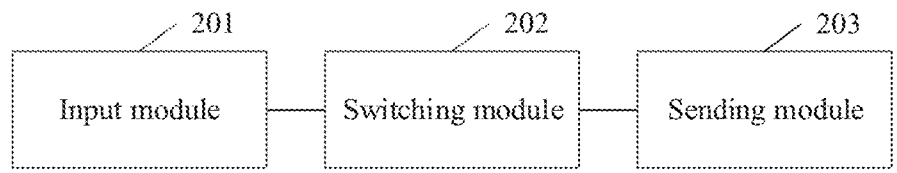
FIG. 2 is a schematic structural diagram of a FlexE switching system.

The following first describes a FlexE switching system for implementing data sending. As shown in FIG. 2, the FlexE switching system includes:

an input module 201, a switching module 202, and a sending module 203.

The input module 201 is configured to successively slice a received FlexE data stream into several data packet slices, insert a time identifier corresponding to each data packet slice into each data packet slice, to generate several slice packets, and send the several slice packets to the switching module 202.

The switching module 202 is configured to switch the several slice packets from the input module 201 to the sending module 203.

The sending module 203 is configured to restore the received slice packets into a data stream, and send the data stream.

Figure 3:
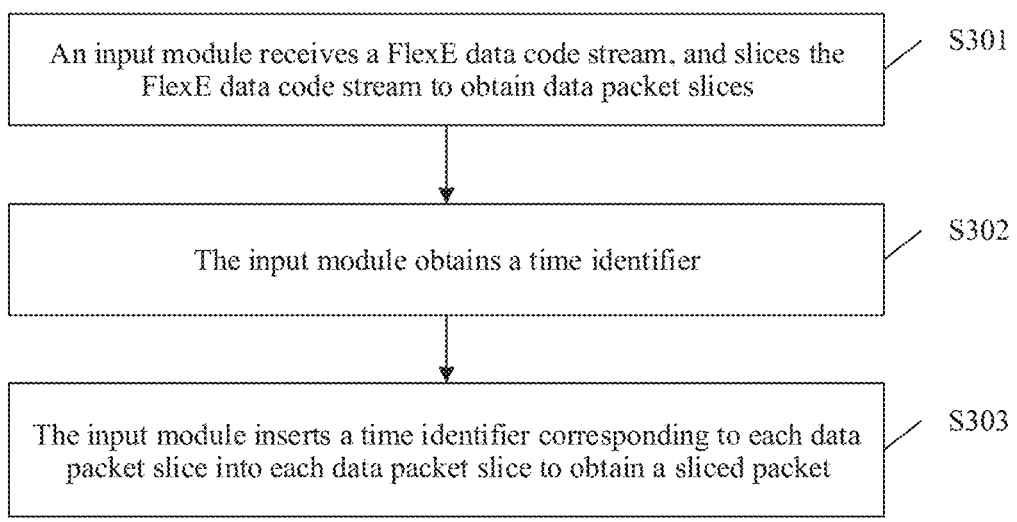
FIG. 3 is a flowchart of a method for generating slice packets by an input module according to an embodiment of this application.

For ease of understanding and explanation, the following describes in detail a process in which the input module 201 generates the slice packets with reference to FIG. 3.

FIG. 3 is a flowchart of a method for generating slice packets by an input module according to an embodiment of this application.

The method for generating slice packets provided in this application may specifically include the following steps.

S301: An input module 201 receives a FlexE data stream, and slice the FlexE data stream to obtain data packet slices.

In an example, the S301 may specifically include the following steps.

S301*a*: The input module 201 continuously caches a serial FlexE data stream, and after a quantity of bytes of the FlexE data stream cached by the input module 201 accumulates to a preset length, the FlexE switching system generates a start pulse control signal and an end pulse control signal. The preset length is a preset length of the data packet slice.

S301*b*: After receiving the start pulse control signal, the input module 201 starts to read a data stream byte by byte from the cached FlexE data stream, and after receiving the end pulse control signal, the input module 201 stops reading the data stream. In this case, the data stream read by the input module 201 between the start pulse control signal and the end pulse control signal forms a data packet slice.

The length of the data packet slice provided in this embodiment of this application is not limited to a fixed length. Therefore, lengths of the data packet slices may be the same or may be different. Further, as another implementation, the lengths of the data packet slices are different, and several data packet slices may be obtained by randomly slicing a data stream, to further improve flexibility of information transmission.

S302. The input module 201 obtains a time identifier.

The time identifier may be time at which the input module 201 of the FlexE switching system generates the data packet slice through slicing, or may be time at which the input module 201 receives a SOP flag of a data packet to which the data packet slice belongs.

To improve transmission efficiency and transmission accuracy of the FlexE data stream, the input module 201 may further obtain information such as a valid field of the data packet slice, a data packet slice sequence, and a link status.

Because the information such as the time identifier, the valid field of the data packet slice, the data packet slice sequence, and the link status is all related information for marking an identity of the data packet slice, in order to conveniently and quickly obtain the related information for marking the identity of the data packet slice, information such as the time identifier, the valid field of the data packet slice, the data packet slice sequence, and the link status is included in data packet slice information.

As an implementation, when the information such as the time identifier, the valid field of the data packet slice, the data packet slice sequence, and the link status is concentrated in the data packet slice information, the S302 may be specifically as follows: The input module 201 obtains the data packet slice information, and the data packet slice information includes the time identifier, the valid field of the data packet slice, the data packet slice sequence, and the link status.

In another implementation, to accurately obtain the time identifier, before the input module 201 receives the FlexE data stream, time of the input module 201 and time of the sending module 203 further need to be adjusted first, so that the time of the input module 201 is synchronized with the time of the sending module 203. This improves accuracy and reliability of the time identifier.

S303: The input module 201 inserts a time identifier corresponding to each data packet slice into each data packet slice to obtain a slice packet.

In an implementation, the S303 may be specifically: When the input module 201 has obtained a first data packet slice and a time identifier of the first data packet slice, the input module 201 may insert the time identifier of the first data packet slice into the first data packet slice, to obtain a slice packet including the first data packet slice.

As another implementation, if the input module 201 has obtained the information such as the time identifier of the data packet slice, the valid field of the data packet slice, the data packet slice sequence, and the link status, the S303 may be specifically: The input module 201 concentrates the information such as the time identifier, the valid field of the data packet slice, the data packet slice sequence, the link status in the data packet slice information. Then, the input module 201 inserts data packet slice information corresponding to each data packet slice into each data packet slice, to obtain a slice packet.

It should be noted that the process of generating a slice packet may be as follows: A data packet slice is sliced to immediately generate a slice packet based on the data packet slice, and then another data packet slice is sliced to generate a corresponding slice packet. The process is repeated until all data streams received by the input module 201 are used to generate slice packets. The process of generating a slice packet may alternatively be as follows: All data streams are first sliced into several data packet slices, and then corresponding slice packets are generated.

The foregoing is related content of the input module 201.

To improve transmission efficiency of a FlexE data stream and reduce a data latency, this embodiment of this application provides a corresponding data sending method for the sending module 203 in the FlexE switching system.

The following describes a data sending method that is provided in an embodiment of this application and that is applied to the sending module 203 in the FlexE switching system.

Figure 4:
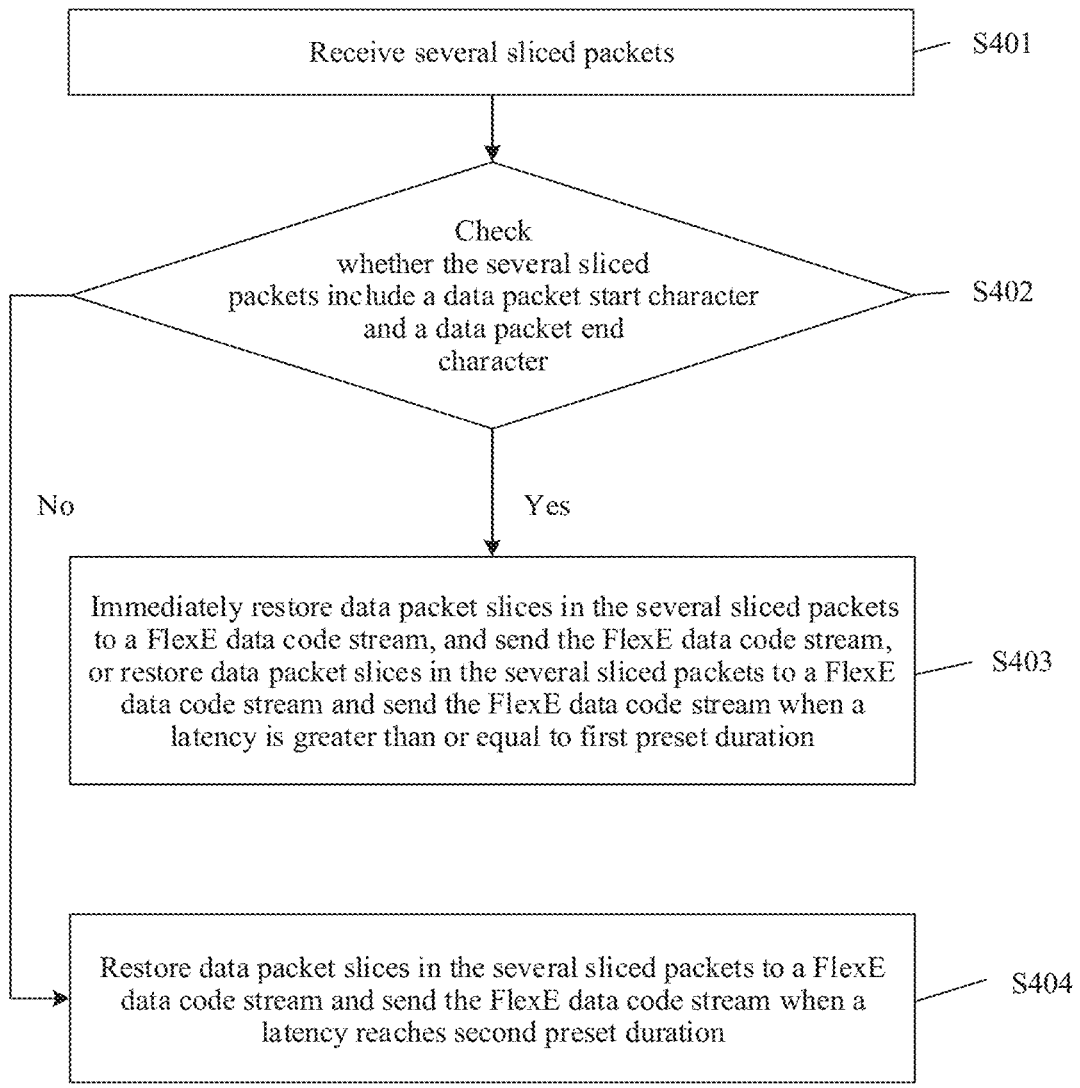
FIG. 4 is a flowchart of a data sending method according to an embodiment of this application.

FIG. 4 is a flowchart of a data sending method according to an embodiment of this application.

The data sending method provided in this embodiment of this application includes the following steps.

S401: Receive several slice packets.

It should be noted that, in this embodiment of this application, after a slice packet is received, the slice packet may be cached.

In addition, each slice packet may include a data packet slice and a time identifier corresponding to the data packet slice. The data packet slice is obtained by successively slicing a FlexE data stream, and the time identifier is time at which an input module of a FlexE switching system generates the data packet slice through slicing or time at which a SOP flag of a data packet to which the data packet slice belongs is received.

S402: Check whether the several slice packets include a SOP flag and a EOP flag of a same data packet. If the several slice packets include the SOP flag and the EOP flag of the same data packet, S403 is performed. If the several slice packets do not include the SOP flag and the EOP flag of the same data packet, S404 is performed.

S403: Immediately restore data packet slices in the several slice packets to a FlexE data stream, and send the FlexE data stream, or when a latency is greater than or equal to first preset duration, restore data packet slices in the several slice packets to a FlexE data stream, and send the FlexE data stream.

It should be noted that the first preset duration is less than second preset duration described subsequently.

S404: When a latency reaches the second preset duration, restore data packet slices in the several slice packets to a FlexE data stream, and send the FlexE data stream.

To avoid that a stream inside the data packet is interrupted, the second preset duration may be a maximum path latency for transmitting the slice packets from the input module of the FlexE switching system to a sending module of the FlexE switching system.

To describe each step in the method more clearly, the following describes a specific implementation of each step in the method one by one.

A specific implementation of the S401 is described as follows.

In an implementation, the S401 may specifically include the following steps.

S401a: The sending module detects whether an error occurs in control information about received slice packets, if an error occurs in the control information of the received slice packets, sends alarm information, and if an error does not occur in the control information of the received slice packets, perform S401b.

Detection content of the control information includes: Detecting whether consecutive packet headers or consecutive packet trailers appear in the received several slice packets, and detecting whether a length of each slice packet is equal to a preset slice length. The preset slice length may be preset, and the preset slice length=a data packet slice length+a data packet slice information length.

S401*b*: The sending module caches the received slice packets, and records receiving time of each slice packet.

S401*c*: The sending module parses each slice packet to obtain each data packet slice and corresponding data packet slice information.

In another implementation, to ensure integrity and accuracy of the data stream sent by the sending module, after the S401*c*, the method may further include: The sending module performs information detection on the data packet slice based on the data packet slice information, and performs the S402 after the information detection is qualified.

The information detection includes data packet slice length detection, data packet slice sequence detection, and link status detection. In addition, that the information detection is qualified means that all detection content is qualified.

The following successively describes the data packet slice length detection, the data packet slice sequence detection, and the link status detection.

The data packet slice length detection is used to detect whether the data packet slice length is equal to the preset length. If the data packet slice length is equal to the preset length, the length detection is qualified. If the data packet slice length is not equal to the preset length, the length detection fails, and an alarm signal is sent, so that the system takes corresponding measures according to the alarm signal. For example, the system adds specific data to the data packet slice, so that the data packet slice length is equal to the preset length.

The data packet slice sequence detection is used to check whether the packet slice sequence complies with a standard sequence. If the packet slice sequence complies with the standard sequence, it indicates that no packet loss occurs, and the sequence detection is qualified. If the packet slice sequence does not comply with the standard sequence, it indicates that a packet loss occurs, and the sequence detection fails. In this case, an alarm signal is sent, so that the system can take corresponding measures according to the alarm signal.

The packet slice sequence is a preset sequence. For example, when the preset packet slice sequence is a cycle of 1 to 8, if a packet slice sequence of a current data packet slice is 2, a packet slice sequence of a previous data packet slice of the data packet slice is 1, and a packet slice sequence of a next data packet slice of the data packet slice is 3. The rest can be deduced by analogy, and packet slice sequences of the several data packet slices are obtained.

The link status detection is used to check whether a link status is normal. If the link status is normal, the link status detection is qualified. If the link status is abnormal, the link detection fails, and an alarm signal is sent, so that the system takes corresponding measures according to the alarm signal.

It should be noted that a sequence of performing the S401*b* and the S401*c* is uncertain, and the S401*b* may be first performed, and then the S401*c* is performed. Alternatively, the S401*c* may be first performed, and then the S401*b* is performed.

The foregoing is the specific implementation of the S401.

A specific implementation of S402 is described as follows.

If the several slice packets received by the sending module include the SOP flag and the EOP flag of the same data packet, it indicates that these slice packets include all data of the data packet, and it indicates that the sending module has received a complete data packet. In this case, if the sending module sends these slice packets, a stream inside the data packet is not interrupted. Therefore, the S403 may be performed.

If at least one of a SOP flag and a EOP flag of a data packet is missing in the several slice packets received by the sending module, it indicates that these slice packets include some data of the data packet, and it indicates that the sending module does not receive a complete data packet. In this case, if the sending module sends these slice packets, a stream inside the data packet may be interrupted. Therefore, to avoid that the stream inside the data packet is interrupted, the S404 may be performed.

It should be noted that, when a length of a data packet slice is a fixed length, a slice packet usually includes a EOP flag of a former data packet and a SOP flag of a latter data packet, and the two data packets are two adjacent data packets. In this case, because the EOP flag and the SOP flag belong to different data packets, the sending module needs to slice the EOP flag and the SOP flag, and separately perform latency determining processing.

The foregoing is the specific implementation of the S402. The following describes a specific implementation of the S403.

A specific implementation of the S403 is described as follows.

As an example, that the data packet slices in the several slice packets are restored to the FlexE data stream, and the FlexE data stream is sent may be specifically: First, the sending module obtains a data packet slice of each slice packet; then, the sending module splices the data packet slices into a continuous FlexE code stream; and finally, the sending module sends the continuous FlexE code stream.

It should be noted that, in the foregoing example, all data packet slices may be first obtained and then successively spliced, or one data packet slice may be obtained and spliced once until all data packet slices are spliced.

In an implementation of the S403, after receiving the EOP flag, the sending module may immediately restore slice packets of the entire data packet received by the sending module to a FlexE data stream and send the FlexE data stream.

It should be noted that, because sizes of data packets are inconsistent, and a size of a data packet affects time at which the sending module receives all slice packets including data of the data packet. If the data packet is larger, the sending module needs relatively long time to receive all slices including the data of the data packet. If the data packet is smaller, the sending module needs relatively short time to receive all slices including the data of the data packet. Therefore, to reduce a time jitter generated when the sending module sends data packets of different sizes, time for sending the entire data packet by the sending module may be adjusted.

Therefore, in another implementation of the S403, the S403 may specifically include: When the latency is greater than or equal to the first preset duration, the data packet slices in the several slice packets are restored to the FlexE data stream, and the FlexE data stream is sent. The first preset duration is less than the second preset duration.

The latency is duration between current time and a time identifier in a slice packet including a SOP flag.

In addition, there are a relatively large quantity of manners of obtaining the first preset duration.

In an example, the first preset duration may be preset based on the second preset duration. More specifically, the first preset duration may be preset to ¼ to ⅓ of the second preset duration.

In another example, the first preset duration may be further obtained based on a path latency for transmitting a large quantity of slice packets from the input module of the FlexE switching system to the sending module of the FlexE switching system.

For example, in a specific example, the first preset duration may be an average path latency for transmitting slice packets from the input module of the FlexE switching system to the sending module of the FlexE switching system.

In another specific example, the first preset duration is a path latency, in a path latency for transmitting slice packets from the input module of the FlexE switching system to the sending module of the FlexE switching system, that accounts for a preset proportion. The preset proportion is preset. The preset proportion may be set based on an actual requirement. For example, it is assumed that the preset proportion is preset to 50%.

For example, it is assumed that the input module of the FlexE switching system separately transmits 100 slice packets to the sending module, where 70 slice packets arrive at the sending module after a first path latency, 10 slice packets arrive at the sending module after a second path latency, and 20 slice packets arrive at the sending module after a third path latency. In this case, a proportion of the first path latency is 70%, a proportion of the second path latency is 10%, and a proportion of the third path latency is 20%. Because 70% is greater than the preset proportion, the first path latency may be used as the first preset duration.

In the foregoing implementation in which when the latency is greater than or equal to the first preset duration, the data packet slices in the several slice packets are restored to the FlexE data stream, and the FlexE data stream is sent, there are the following two scenarios.

Scenario 1: Slice packets including a SOP flag and a EOP flag are received within a first latency, and the first latency is less than the first preset duration.

For example, if the sending module receives, within the first latency, the slice packets including the SOP flag and the EOP flag, after receiving a slice packet including the EOP flag, to reduce a time jitter between data packets, the sending module needs to wait until the latency reaches the first preset duration, and then the sending module can restore the data packet slices in the several slice packets to a FlexE data stream, and sends the FlexE data stream. In other words, when the latency of the sending module is equal to the first preset duration, the sending module restores the data packet slices in the several slice packets to the FlexE data stream, and send the FlexE data stream.

Scenario 2: Slice packets including a SOP flag and a EOP flag are received within a second latency, the second latency is greater than or equal to the first preset duration, and the second latency is less than or equal to the second preset duration.

As an example, if the sending module receives, within the second latency, the slice packets including the SOP flag and the EOP flag, when receiving a slice packet including the EOP flag, the sending module immediately restores the data packet slices in the several slice packets to the FlexE data stream, and sends the FlexE data stream. In other words, when the latency is greater than the first preset duration, the sending module restores the data packet slices in the several slice packets to the FlexE data stream, and sends the FlexE data stream.

For ease of understanding and explanation, the following describes specific implementations in the foregoing two scenarios.

In an example, the S403 may specifically include the following steps.

S403a: The sending module obtains a data packet latency.

The data packet latency may be duration between time at which a slice packet including a EOP flag is received and a time identifier in the slice packet including the EOP flag, or may be duration between time at which a slice packet including a EOP flag is received and a time identifier in a slice packet including a SOP flag, or may be duration between time at which the sending module obtains a data packet slice including a EOP flag and a time identifier in a slice packet including the EOP flag, or may be duration between time at which the sending module obtains a data packet slice including a EOP flag and a time identifier in a slice packet including a SOP flag.

S403b: Determine whether the data packet latency is less than the first preset duration, if the data packet latency is less than the first preset duration, perform S403c, and if the data packet latency is greater than or equal to the first preset duration, perform S403d.

If the data packet latency is less than the first preset duration, it indicates that the sending module receives, within the first latency, the slice packets including the SOP flag and the EOP flag, after receiving a slice packet including the EOP flag, to reduce a time jitter between data packets, the sending module needs to wait until the latency reaches the first preset duration, and then the sending module can restore the data packet slices in the several slice packets to a FlexE data stream, and sends the FlexE data stream.

If the data packet latency is greater than or equal to the first preset duration, it indicates that the sending module may receive, within the second latency, the slice packets including the SOP flag and the EOP flag, or may not receive, when the latency reaches the second preset duration, a slice packet including the EOP flag. Therefore, whether the data packet latency is less than the second preset duration may be first determined.

S403c: When the latency reaches the first preset duration, restore the data packet slices in the several slice packets to the FlexE data stream and send the FlexE data stream.

S403d: Determine whether the data packet latency is less than the second preset duration, if the data packet latency is less than the second preset duration, perform S403e, and if the data packet latency is greater than or equal to the first preset duration, perform the S404.

S403e: At a current moment, restore the data packet slices in the several slice packets to the FlexE data stream, and send the FlexE data stream.

To better understand another implementation of the S403, the following is an example.

It is assumed that the second preset duration is 30 μs, the first preset duration is 10 μs, and the FlexE switching system transmits a first data packet of 1500 bytes. If the sending module receives, at 1 μs, a slice packet including a start character of the first data packet, and the sending module receives, at 12 μs, a slice packet including an end character of the first data packet. In this case, the sending module immediately restores the data packet slices in the several slice packets to the FlexE data stream, and sends the FlexE data stream.

If the FlexE switching system transmits a second data packet of 64 bytes, the sending module receives, at 2 μs, a slice packet including a start character of a second data packet, and the sending module receives, at 8 μs, a slice packet including an end character of the second data packet. Because 8 μs is less than 10 μs, the data packet slices in the several slice packets can be restored to the FlexE data stream after 10 μs, and the FlexE data stream is sent.

The foregoing is the specific implementation of the S403.

A specific implementation of the S404 is described as follows.

It should be noted that the second preset duration is not less than a maximum path latency for transmitting the slice packets from the input module of the FlexE switching system to the sending module of the FlexE switching system.

For example, assuming that the second preset duration is 30 μs, the first preset duration is 10 μs, and the FlexE switching system transmits a third data packet of 9600 bytes, the S404 may be specifically: The sending module receives, at 1 μs, a slice packet including a start character of the third data packet, and at 30 μs, the sending module still does not receive a slice packet including the third EOP flag. However, because the latency reaches 30 μs, the data packet slices in the several slice packets need to be restored to the FlexE data stream, and the FlexE data stream is sent.

The foregoing is the specific implementation of the S404.

The foregoing is the specific implementation of the data sending method provided in this embodiment of this application. In this specific implementation, when the slice packets received by the sending module include the SOP flag and the EOP flag of the same data packet, it indicates that the sending module receives a complete data packet, and immediately sends the data packet slices, or sends the data packet slices after the latency is less than a maximum path latency of the slice packets. In this way, a stream inside the data packet is not interrupted, a data sending latency is reduced, and transmission efficiency of the FlexE data stream is improved. When the slice packets received by the sending module include the SOP flag of the data packet but do not include the EOP flag of the data packet, it indicates that the sending module has not received a complete data packet. In this case, the sending module sends the data packet slices after a latency of at least a maximum path latency of the slice packets, and a stream of the slice packets is not interrupted.

Therefore, according to the data sending method provided in this application, not all data packet slices need to be sent after the maximum path latency of the slice packets. Therefore, the data sending method provided in this application achieves an effect of reducing a data sending latency of the FlexE switching system and improving transmission efficiency of the FlexE data stream on the premise of avoiding that a stream inside the data packet is interrupted.

More specifically, by using the data sending method provided in this embodiment of this application, a transmission latency of a small data packet can be significantly shortened, and data packet transmission efficiency can be significantly improved.

Based on the data sending method provided above, an embodiment of this application further provides a data sending module. The following explains and describes the data sending module with reference to the accompanying drawings.

Figure 5:
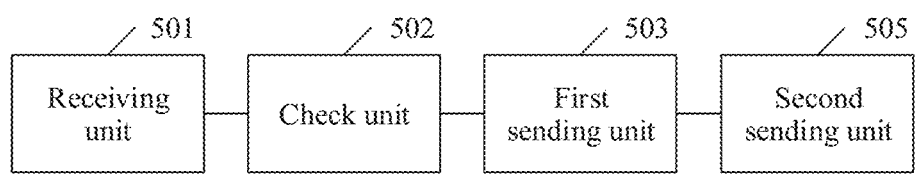
FIG. 5 is a schematic structural diagram of a data sending module according to an embodiment of this application.

FIG. 5 is a schematic structural diagram of a data sending module according to an embodiment of this application.

A data sending module provided in an embodiment of this application includes:

a receiving unit 501, configured to receive several slice packets;

a check unit 502, configured to check whether the several slice packets include a SOP flag and a EOP flag:

a first sending unit 503, configured to: when the several slice packets include a SOP flag and a EOP flag, restore data packet slices in the several slice packets to a FlexE data stream, and send the FlexE data stream; and a second sending unit 504, configured to: when the several slice packets do not include a EOP flag of a data packet, restore data packet slices in the several slice packets to a FlexE data stream and send the FlexE data stream when a latency reaches second preset duration.

In another implementation, to reduce a time jitter generated when the sending module sends data packets of different sizes, the first sending unit 503 is specifically configured to:

when a latency is greater than or equal to first preset duration, restore data packet slices in the several slice packets to a FlexE data stream, and send the FlexE data stream.

The first preset duration is less than the second preset duration.

As an example, the first sending unit 503 may specifically include;

a first sending subunit, configured to: when slice packets including the SOP flag and the EOP flag are received within a first latency, when the latency reaches the first preset duration, restore the data packet slices in the several slice packets to the FlexE data stream, and sending the FlexE data stream, where the first latency is less than the first preset duration; and a second sending subunit, configured to: when slice packets including the SOP flag and the EOP flag are received within a second latency, restore, within the second latency, the data packet slices in the several slice packets to the FlexE data stream, and send the FlexE data stream, where the second latency is greater than or equal to the first preset duration, and the second latency is less than or equal to the second preset duration.

In another implementation, to further reduce a time jitter generated when the sending module sends data packets of different sizes, the first preset duration is ¼ to ⅓ of the second preset duration, or may be an average path latency for transmitting slice packets from the input module of the FlexE switching system to the sending module of the FlexE switching system, or may be a path latency, in a path latency for transmitting slice packets from the input module of the FlexE switching system to the sending module of the FlexE switching system, that accounts for a preset proportion.

In still another implementation, to improve flexibility for transmitting a data stream by the FlexE switching system, lengths of data packet slices are the same or different.

The foregoing is the specific implementation of the data sending module provided in this embodiment of this application. When the slice packets received by the sending module include the SOP flag and the EOP flag of the same data packet, it indicates that the sending module receives a complete data packet, and immediately sends the data packet slices, or sends the data packet slices after the latency is less than a maximum path latency of the slice packets. In this way, a stream inside the data packet is not interrupted, a data sending latency is reduced, and transmission efficiency of the FlexE data stream is improved. When the slice packets received by the sending module include the SOP flag of the data packet but do not include the EOP flag of the data packet, it indicates that the sending module has not received a complete data packet. In this case, the sending module sends the data packet slices after a latency of at least a maximum path latency of the slice packets, and a stream of the slice packets is not interrupted.

Therefore, by using the data sending module provided in this application, not all data packet slices need to be sent after the maximum path latency of the slice packets. Therefore, the data sending method provided in this application achieves an effect of reducing a data sending latency of the FlexE switching system and improving transmission efficiency of the FlexE data stream on the premise of avoiding that a stream inside the data packet is interrupted.

Based on the data sending method and the data sending module provided above, an embodiment of this application further provides a FlexE switching system. The following explains and describes the FlexE switching system with reference to the accompanying drawings.

Figure 6:
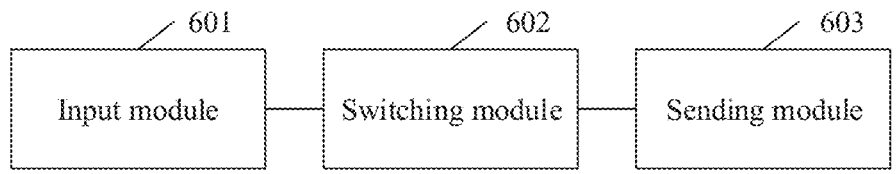
FIG. 6 is a schematic structural diagram of a FlexE switching system according to an embodiment of this application.

FIG. 6 is a schematic structural diagram of a FlexE switching system according to an embodiment of this application.

A FlexE switching system provided in an embodiment of this application includes an input module 601, a switching module 602, and a sending module 603.

The input module 601 is configured to successively slice a received FlexE data stream into several data packet slices, and insert a time identifier corresponding to each data packet slice into each data packet slice, to generate several slice packets.

The switching module 602 is configured to switch the several slice packets from the input module 601 to the sending module 603.

The sending module 603 is any data sending module provided in the foregoing embodiments.

A working process of the FlexE switching system may be specifically as follows.

First, the input module 601 receives the FlexE data stream, slices the received data stream into several data packet slices, and inserts time identifiers into the data packet slices, to obtain the several slice packets, so that the input module 601 sends the slice packets to the switching module 602.

Then, the switching module 602 switches the received slice packet, and sends the slice packet to the sending module 603.

Then, the sending module 603 caches the received slice packets, and determines whether the cached slice packets include a SOP flag and a EOP flag. If the cached slice packets include the SOP flag and the EOP flag, when current time or a latency reaches second preset duration, the sending module 603 restores the data packet slices in the several slice packets to a FlexE data stream, and sends the FlexE data stream. If the cached slice packets do not include a SOP flag and an EOP flag, when a latency reaches second preset duration, the sending module 603 restores the data packet slices in the several slice packets to a FlexE data stream, and sends the FlexE data stream.

As an implementation, the FlexE switching system is a chassis structure. The chassis structure includes a line card and a fabric card, the input module 601 and the sending module 603 are disposed on the line card, and the switching module 602 is disposed on the fabric card.

Figure 7:
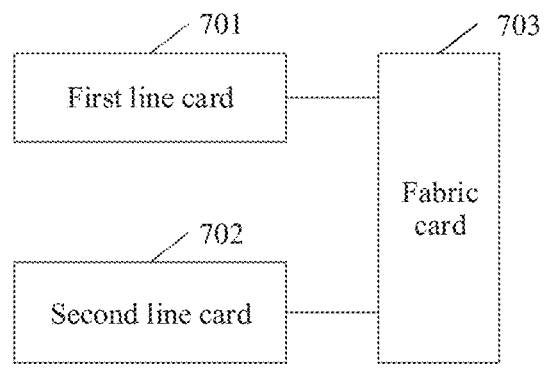
FIG. 7 shows a chassis structure according to an embodiment of this application.

For ease of explanation and description, the following uses the chassis structure shown in FIG. 7 as an example for description.

FIG. 7 shows a chassis structure according to an embodiment of this application.

The chassis structure in FIG. 7 includes a first line card 701, a second line card 702, and a fabric card 703. The input module 601 is disposed on the first line card 701, the sending module 603 is disposed on the second line card 702, and the switching module 602 is disposed on the fabric card 603.

In another implementation, the FlexE switching system is an SOC box-shaped structure, the SOC box-shaped structure includes an SOC chip, and the input module 601, the switching module 602, and the sending module 603 are disposed on the SOC chip.

Figure 8:
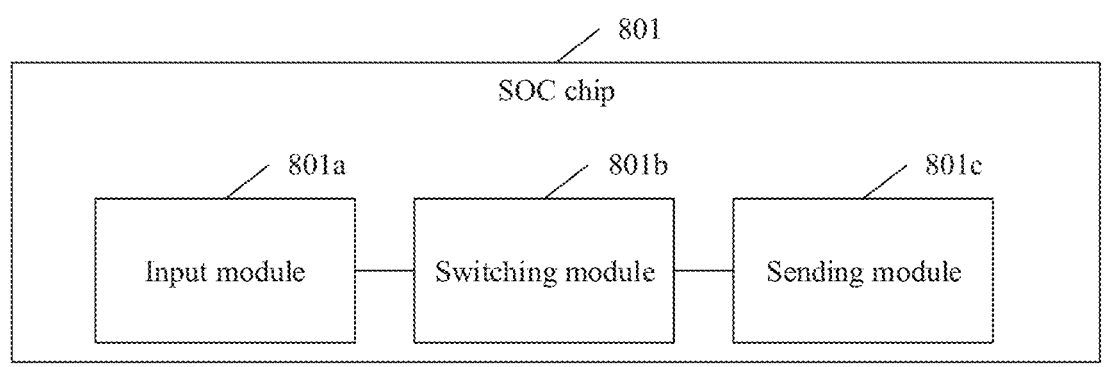
FIG. 8 shows an SOC box-shaped structure according to an embodiment of this application.

For ease of explanation and description, the following uses an SOC box-shaped structure shown in FIG. 8 as an example for description.

FIG. 8 shows an SOC box-shaped structure according to an embodiment of this application.

The SOC box-shaped structure shown in FIG. 8 includes an SOC chip 801, and an input module 801a, a switching module 801b, and a sending module 801c are disposed on the SOC chip 801.

In still another implementation, there are a plurality of SOC chips, and the input module 801a, the switching module 801b, and the sending module 801c are separately disposed on different SOC chips.

The input module 801a, the switching module 801b, and the sending module 801c respectively perform functions of the input module 601, the switching module 602, and the sending module 603.

Figure 9:
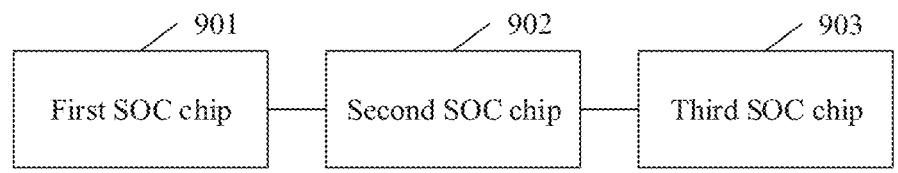
FIG. 9 shows another SOC box-shaped structure according to an embodiment of this application.

For ease of explanation and description, the following uses an SOC box-shaped structure shown in FIG. 9 as an example for description.

FIG. 9 shows another SOC box-shaped structure according to an embodiment of this application.

The SOC box-shaped structure in FIG. 9 includes a first SOC chip 901, a second SOC chip 902, and a third SOC chip 903. The input module 601 is disposed on the first SOC chip 901, the switching module 602 is disposed on the second SOC chip 902, and the sending module 603 is disposed on the third SOC chip 903.

The FlexE switching system provided in this embodiment of this application includes the input module 601, the switching module 602, and the sending module 603. In the system, when slice packets received by the sending module 603 include a SOP flag and a EOP flag, it indicates that the sending module 603 receives a complete data packet. In this case, the sending module 603 sends the data packet slices. In this way, a stream inside the data packet is not interrupted, a data sending latency is reduced, and transmission efficiency of the FlexE data stream is improved. When the slice packets received by the sending module 603 do not include a EOP flag, it indicates that the sending module 603 has not received a complete data packet. In this case, the sending module 603 sends the data packet slices after a maximum path latency of the slice packets, and a stream inside the data packet is not interrupted.

Therefore, by using the FlexE switching system provided in this application, not all data packet slices need to be sent after a latency of specific duration. Data packet slices belonging to a small data packet are immediately sent after a complete data packet is received, and data packet slices belonging to a large data packet need to be sent after a latency of specific duration. Therefore, the data sending method provided in this application achieves an effect of reducing a data sending latency of the FlexE switching system and improving transmission efficiency of the FlexE data stream on the premise of avoiding that a stream inside the data packet is interrupted.

What is claimed is:

1. A data sending method, applied to a sending module in a flexible Ethernet (FlexE) switching system, wherein the method comprises:
receiving several slice packets;
determining whether the several slice packets comprise a Start of Packet (SOP) flag and an End of Packet (EOP) flag of a same data packet;

in response to determining that the several slice packets comprise the SOP flag and the EOP flag of the same data packet:
  restoring data packet slices in the several slice packets to a FlexE data stream, and sending the FlexE data stream immediately; or
  restoring the data packet slices in the several slice packets to the FlexE data stream, and sending the FlexE data stream when a latency is greater than or equal to a first preset duration; and
in response to determining that the several slice packets comprise the SOP flag of the same data packet but do not comprise the EOP flag of the same data packet, restoring the data packet slices in the several slice packets to the FlexE data stream, and sending the FlexE data stream when the latency reaches a second preset duration, wherein the first preset duration is less than the second preset duration.

2. The method according to claim 1, wherein the first preset duration is ¼ to ⅓ of the second preset duration.

3. The method according to claim 1, wherein the first preset duration is an average path latency for transmitting the several slice packets from an input module of the FlexE switching system to the sending module of the FlexE switching system.

4. The method according to claim 1, wherein the first preset duration is a path latency, and wherein in the path latency for transmitting the several slice packets from an input module of the FlexE switching system to the sending module of the FlexE switching system, the first preset duration accounts for a preset proportion.

5. The method according to claim 1, wherein lengths of the data packet slices are the same or different.

6. The method according to claim 1, wherein the second preset duration is not less than a maximum path latency for transmitting the several slice packets from an input module of the FlexE switching system to the sending module of the FlexE switching system.

7. A data sending apparatus, comprising:
  a non-transitory computer-readable storage medium storing instructions; and
  one or more processors in communication with the medium and upon execution of the instructions, configured to:
    receive several slice packets;
    determine whether the several slice packets comprise a Start of Packet (SOP) flag and an End of Packet (EOP) flag of a same data packet;
    in response to determining that the several slice packets comprise the SOP flag and the EOP flag of the same data packet:
      restore data packet slices in the several slice packets to a FlexE data stream, and send the FlexE data stream immediately; or
      restore the data packet slices in the several slice packets to the FlexE data stream, and send the FlexE data stream when a latency is greater than or equal to a first preset duration; and
    in response to determining that the several slice packets comprise the SOP flag of the same data packet but do not comprise the EOP flag of the same data packet, restore data packet slices in the several slice packets to the FlexE data stream and send the FlexE data stream when the latency reaches a second preset duration, wherein the first preset duration is less than the second preset duration.

8. The data sending apparatus according to claim 7, wherein the one or more processors are configured to: when the latency is greater than or equal to the first preset duration, restore the data packet slices in the several slice packets to the FlexE data stream, and send the FlexE data stream, wherein the first preset duration is less than the second preset duration.

9. A FlexE switching system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    slicing a received FlexE data stream into several data packet slices, and inserting a time identifier corresponding to each data packet slice into each data packet slice to generate several slice packets;
    switching the several slice packets from an input module to a sending module;
    determine, by the sending module, whether the several slice packets comprise a Start of Packet (SOP) flag and an End of Packet (EOP) flag of a same data packet;
    in response to determining that the several slice packets comprise t SOP flag and the EOP flag of the same data packet;
      restoring the several data packet slices in the several slice packets to a FlexE data stream, and sending the FlexE data stream immediately; or
      restoring the data packet slices in the several slice packets to the FlexE data stream, and sending the FlexE data stream when a latency is greater than or equal to a first preset duration; and
    in response to determining that the several slice packets comprise the SOP flag of the sane data packet but do not comprise the EOP flag of the same data packet, restoring the several data packet slices in the several slice packets to the FlexE data stream, and sending the FlexE data stream when the latency reaches a second preset duration.

10. The FlexE switching system according to claim 9, wherein the FlexE switching system is a chassis structure which comprises a line card and a fabric card, and wherein the input module and the sending module are disposed on the line card, and a switching module is disposed on the fabric card.

11. The FlexE switching system according to claim 9, wherein the FlexE switching system is an SOC box-shaped structure which comprises a System on Chip (SOC) chip, and wherein the input module, a switching module, and the sending module are disposed on the SOC chip.

12. The FlexE switching system according to claim 11, wherein the SOC box-shaped structure comprises a plurality of SOC chips, and wherein the input module, the switching module, and the sending module are separately disposed on different SOC chips.

* * * * *

UNITED STATES PATENT AND TRADEMARK OFFICE
CERTIFICATE OF CORRECTION

| | | |
|---|---|---|
| PATENT NO. | : 11,799,576 B2 | Page 1 of 1 |
| APPLICATION NO. | : 17/242929 | |
| DATED | : October 24, 2023 | |
| INVENTOR(S) | : Wenhua Du et al. | |

It is certified that error appears in the above-identified patent and that said Letters Patent is hereby corrected as shown below:

In the Claims

Column 20, Line 31 (Approx.), Claim 9, please delete "t" and insert therefore -- the --;

Column 20, Line 32, Claim 9, please delete "packet;" and insert therefore -- packet: --;

Column 20, Line 41, Claim 9, please delete "sane" and insert therefore -- same --.

Signed and Sealed this
Thirtieth Day of April, 2024

*Katherine Kelly Vidal*

Katherine Kelly Vidal
*Director of the United States Patent and Trademark Office*